(12) United States Patent
Zabiego et al.

(10) Patent No.: US 9,548,139 B2
(45) Date of Patent: Jan. 17, 2017

(54) MULTILAYER TUBE IN CERAMIC MATRIX COMPOSITE MATERIAL, RESULTING NUCLEAR FUEL CLADDING AND ASSOCIATED MANUFACTURING PROCESSES

(75) Inventors: Maxime Zabiego, Pierrevert (FR); Cédric Sauder, Saint Arnoult en Yvelines (FR); Christophe Lorrette, Villenave d'Ornon (FR); Philippe Guedeney, Manosque (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 118 days.

(21) Appl. No.: 14/236,189

(22) PCT Filed: Aug. 1, 2012

(86) PCT No.: PCT/EP2012/065035
§ 371 (c)(1),
(2), (4) Date: Jan. 30, 2014

(87) PCT Pub. No.: WO2013/017621
PCT Pub. Date: Feb. 7, 2013

(65) Prior Publication Data
US 2014/0153688 A1 Jun. 5, 2014

(30) Foreign Application Priority Data
Aug. 1, 2011 (FR) ...................................... 11 57042

(51) Int. Cl.
*G21C 3/07* (2006.01)
*B32B 1/08* (2006.01)
(Continued)

(52) U.S. Cl.
CPC . *G21C 3/07* (2013.01); *B32B 1/08* (2013.01); *B32B 9/005* (2013.01); *B32B 9/041* (2013.01);
(Continued)

(58) Field of Classification Search
CPC ................ G21C 3/06; G21C 3/07; G21C 3/10
(Continued)

(56) References Cited

U.S. PATENT DOCUMENTS 4,228,826 A * 10/1980 Campbell, Jr. ......... C04B 30/02
138/149
5,182,077 A   1/1993 Feinroth
(Continued)

FOREIGN PATENT DOCUMENTS

WO    2010/031925 A2    3/2010

OTHER PUBLICATIONS

International Search Report for Application No. PCT/EP2012/065035 dated Nov. 14, 2012.
(Continued)

*Primary Examiner* — Jack W Keith
*Assistant Examiner* — Lily C Garner
(74) *Attorney, Agent, or Firm* — Pearne & Gordon LLP (57) ABSTRACT

The invention relates to a multilayer tubular part (1) comprising a metal layer forming a metal tubular body (3) and two layers in ceramic matrix composite material covering the metal tubular body, wherein one of the two layers in ceramic matrix composite material covers the inner surface of the metal tubular body to form an inner tubular body (4), whilst the other of the two layers in ceramic matrix composite material covers the outer surface of the metal tubular body to form an outer tubular body (2), the metal tubular body therefore being sandwiched between the inner and outer tubular bodies. The metal tubular body is in metal or metal alloy. Finally, the metal tubular body has a mean
(Continued)

thickness smaller than the mean thicknesses of the inner and outer tubular bodies. A said part is useful in particular for producing nuclear fuel claddings.

14 Claims, 2 Drawing Sheets

(51) Int. Cl.

| | | |
|---|---|---|
| C04B 37/02 | (2006.01) | |
| G21C 3/10 | (2006.01) | |
| G21C 21/02 | (2006.01) | |
| G21C 3/06 | (2006.01) | |
| B32B 9/00 | (2006.01) | |
| B32B 9/04 | (2006.01) | |

(52) U.S. Cl.
CPC ............ *C04B 37/021* (2013.01); *C04B 37/025* (2013.01); *G21C 3/06* (2013.01); *G21C 3/10* (2013.01); *G21C 21/02* (2013.01); *B32B 2307/538* (2013.01); *B32B 2307/54* (2013.01); *B32B 2597/00* (2013.01); *C04B 2235/6028* (2013.01); *C04B 2235/6562* (2013.01); *C04B 2235/963* (2013.01); *C04B 2237/086* (2013.01); *C04B 2237/36* (2013.01); *C04B 2237/365* (2013.01); *C04B 2237/38* (2013.01); *C04B 2237/385* (2013.01); *C04B 2237/403* (2013.01); *C04B 2237/704* (2013.01); *C04B 2237/706* (2013.01); *C04B 2237/765* (2013.01); *C04B 2237/84* (2013.01); *Y02E 30/40* (2013.01)

(58) Field of Classification Search
USPC .................................................. 376/409–412
See application file for complete search history.

(56) References Cited

U.S. PATENT DOCUMENTS

| | | | |
|---|---|---|---|
| 5,681,511 A | | 10/1997 | Streckert |
| 5,997,802 A | * | 12/1999 | Holcombe, Jr. ........ B22D 41/00 266/275 |
| 2002/0003004 A1 | * | 1/2002 | Guckert .................. B29C 53/60 138/137 |
| 2006/0039524 A1 | | 2/2006 | Feinroth |
| 2007/0163250 A1 | * | 7/2007 | Sane .......................... F01N 3/20 60/323 |
| 2009/0101658 A1 | | 4/2009 | Maile |
| 2009/0220040 A1 | | 9/2009 | Takagi |
| 2010/0263195 A1 | | 10/2010 | Niccolls |
| 2011/0170653 A1 | | 7/2011 | Cabrero et al. |
| 2013/0163711 A1 | * | 6/2013 | Zabiego .................... G21C 3/16 376/433 |

OTHER PUBLICATIONS

Spatz et al. "Design of hybrid ceramic-metal tubes", Preceedings for HTCMC-7, pp. 572-578.
Preliminary International Search Report issued in Patent Application No. PCT/EP2012/065035 dated Nov. 18, 2013.

* cited by examiner

MULTILAYER TUBE IN CERAMIC MATRIX COMPOSITE MATERIAL, RESULTING NUCLEAR FUEL CLADDING AND ASSOCIATED MANUFACTURING PROCESSES

TECHNICAL FIELD

The present invention relates to the field of parts in ceramic matrix composite material. In particular, the present invention relates to the field of fuel elements for nuclear reactors, and more particularly to an improved cladding for nuclear fuel, to nuclear reactor fuel rods using such claddings and the manufacturing processes thereof.

Said improved fuel cladding may, as an example, be used to produce fuel elements of pin or rod geometry in fourth generation reactors of GFR type (Gas-cooled fast reactor).

It can also be used in other nuclear reactors such as PWRs (pressurized water reactors), BWRs (boiling water reactors) or SFRs (sodium-cooled fast reactors).

STATE OF THE PRIOR ART

Ceramic matrix composite materials (CMCs) are particularly appreciated in numerous fields on account of their low density, remarkable mechanical properties in particular in terms of hardness, toughness, resistance to wear and resistance to mechanical and heat shock, in addition to their good behaviour under neutron flow and high temperature for applications in the nuclear field. By <<high temperature>> is meant a temperature over and above which the thermo-mechanical behaviour of usual materials (steels for fast spectrum reactors and zirconium alloys for thermal spectrum reactors) is no longer satisfactory. This corresponds to a temperature of the order of 400° C. to 600° C. under nominal operating conditions and of the order of 1000° C. to 1200° C. under accidental operating conditions. For example for GFRs, the operating temperatures targeted for normal operating conditions reach up to 1000° C. and up to 1600° C., even 2000° C. for accidental transients.

It is recalled in this respect that a CMC material is formed of a ceramic matrix which is reinforced by a fibrous ceramic structure on which an interphase material is deposited whose main role is to deflect the cracks generated within the matrix under mechanical stresses; the matrix and the fibres may be in any known ceramic material, including carbon (carbon in this context being considered to be a ceramic material), the interphase material possibly being a pyrocarbon.

As examples, such materials are used in aeronautics to produce brake discs or for parts entering into the manufacture of reactors operating at high temperature; they are also given use in the manufacture of parts for gas turbines; and finally, and this is the first application concerned by this patent, they are used for the manufacture of cladding materials for fuel elements and control rods of nuclear reactors.

Despite their numerous advantages, CMC materials have one major disadvantage however: they are not hermetic over their entire range of potential operation. Therefore, these materials are not adapted for applications as pressure chamber or pressurized conduit as is the case in particular for nuclear fuel claddings or heat exchanger tubes since they do not offer any guarantee of leak-tightness over their entire potential range of operation. For example, for a nuclear reactor fuel element whose cladding forms the first containment barrier for radioactive products generated when in operation, the risk of lack of hermetic tightness before dismantling clearly amounts to a major drawback making CMC materials in theory unsuitable for such use and unacceptable for nuclear safety authorities.

Figure 1:
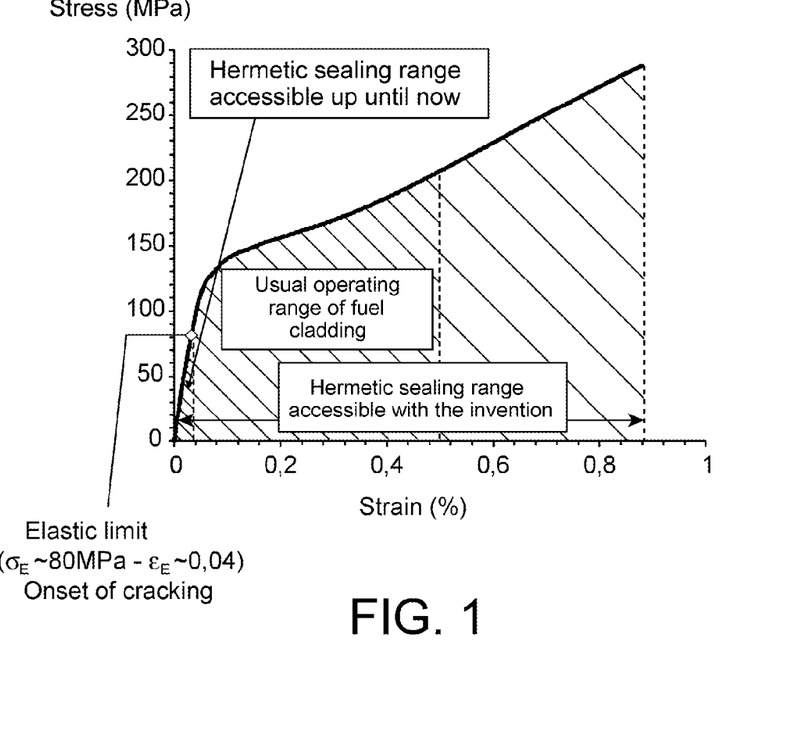
FIG. 1, already previously mentioned, illustrates the behaviour of a 2D braided tubular $SiC_f$/SiC composite subjected to uniaxial tensile stress, the strain being shown along the X-axis and stress along the Y-axis. This traction curve evidences an elastic region (proportionality between stress and strain) extending up to a stress of about 80 MPa and strain corresponding to 0.04% elongation, which delimits the usual operating range over which the hermetic seal of the composite can be envisaged: beyond these values multiple cracking of the matrix occurs which causes loss of hermetic sealing. Also FIG. 1 evidences the yield characteristics of the composite, for stress of the order of 300 MPa and elongation of the order of 0.9%. Finally.

The specific behaviour of CMC materials with respect to the requirement of hermetic sealing, which is a major challenge for this patent, is clearly illustrated in FIG. 1. FIG. 1 illustrates the mechanical behaviour of a CMC material of $SiC_f/SiC$ type (silicon carbide matrix composite reinforced with a fibrous structure in silicon carbide) subjected to a uniaxial tensile test in a diagram showing the relationship between strain (along the X-axis) and stress (Y-axis). This Figure evidences the fact that the CMC material of $SiC_f/SiC$ type examined here has an appreciable elongation at break of the order of 0.9% for an ultimate stress of the order of 300 MPa, but which however has a much more reduced linear elasticity range with elongation of the order of 0.04% and elastic limit in the region of 80 MPa. Yet beyond their elastic limit, CMC materials are characterized by a damage mode termed <<multiple matrix cracking>> which translates as the onset of numerous cracks. This most particular mechanism enables CMC materials to reach fully remarkable percentage elongation at break for a ceramic, but sets aside any hope of the said materials maintaining tightness beyond this elastic limit.

If the values mentioned above (on the basis of FIG. 1) are compared with the operating conditions usually required for nuclear fuel cladding, for example elongations of 0.2 to 0.5% and stresses higher than 100 MPa possibly reaching 200 MPa under the most extreme sizing conditions, it then becomes evident that a CMC cladding alone is not able to meet the requirement of tightness that is strictly laid down by safety regulations.

Several studies available in the literature report on the development of processes making it possible to extend the hermetic sealing range of parts in ceramic matrix composites.

As examples, documents [1] to [3], whose references are given at the end of this description, describe the manufacture of a nuclear fuel cladding composed of a tube in CMC material coated with a ceramic layer (for documents [1] and [3]), or composed of a tube in CMC material sandwiched between an inner ceramic layer and an outer ceramic layer ([2]).

However, aside from the fact that the obtaining of a monolithic ceramic layer over the usual lengths of a nuclear fuel cladding (greater than 1 meter and possibly reaching 4 meters) is particularly difficult (document [2] effectively mentions the producing of sections that then have to be assembled, which carries the risk of weakening the final component), the hermetic sealing of the claddings described in documents [1] to [3] is only valid within the linear elasticity range of the multilayer formed, and in particular within the elasticity range of the ceramic used, which is unfortunately much reduced. Namely, this means that if a crack is initiated within the multilayer and more particularly in the monolithic ceramic ensuring the hermetic seal (after mechanical shock or damage beyond its linear elastic strength) the hermetic seal is lost and the cladding becomes permeable. Therefore if FIG. 11 for example of document [2] is considered, it is noted that the failure of the inner monolithic ceramic which ensures the hermetic seal occurs at the latest with elongation of the order of 0.2% (corresponding to the maximum of the <<stress versus strain>> curve). In fact despite its ultimate strength performance, the multilayer proposed in document [2] is not capable of meeting the specifications for a nuclear fuel element, which require the hermetic seal of the cladding to be guaranteed over the entire operating range which clearly extends beyond 0.2% strain.

It is also known, for the manufacture of pressure conduits or chambers (apart from the particular field of nuclear fuels) to use a structure in CMC material lined on the inner side with a metal layer (documents [4] and [5]). However, for an application as cladding for a nuclear fuel element the said solution has various shortcomings.

In general, the inner positioning of the metal layer ensuring the hermetic seal makes it sensitive to attack by the fuel namely the implanting, over a depth of the order of 10 micrometers, of fission products generated with high kinetic energies on the periphery of the fuel, and corrosion of the metal layer via thermo-chemical reaction with the fuel and/or the fission products.

More specifically regarding the case of nuclear reactors with pressurized cooling (of the order of 70 bars in GFRs and BWRs, and of the order of 155 bars in PWRs), a bilayer cladding (CMC layer ensuring outer mechanical strength and metal layer ensuring the inner hermetic seal) carries the risk of collapse of the inner metal layer which may be caused by loss of hermetic sealing of the CMC layer which, through its multi-cracking, would allow the outer pressure of the coolant (which in theory is higher, at least at the start of irradiation, than the inner pressure of the fuel element filling gas) to be applied directly onto the inner metal layer leading to excessive deformation thereof preferably via a mechanism of creep type (known as <<creep-down>> in the field of nuclear fuel in which the origin of creep is associated with the high temperatures and neutron irradiation).

Therefore, the application of this solution to nuclear fuels (which to our knowledge has never yet been implemented) would require the use of large thicknesses for the metal layer, which would considerably limit the choice of metal material (on account of neutron absorption of refractory metals).

In the light of the foregoing, the objective of the invention is to overcome at least in part the disadvantages mentioned above relating to prior art embodiments. In particular, the inventors have set themselves the objective of designing a tubular part in CMC material which has even further improved hermetic sealing compared with the prior art tubular parts, this part able to be used as cladding for nuclear fuel. More particularly, the inventors have sought to extend the range of hermetic sealing of a tubular part in CMC beyond the elastic limit of the said material, preferably up to the yield point of the said CMC material.

DESCRIPTION OF THE INVENTION

This objective is reached by the invention which firstly proposes a multilayer tubular part comprising a metal layer forming a metal tubular body and two layers in ceramic matrix composite material covering the metal tubular body, characterized in that one of the two layers in ceramic matrix composite material coats the inner surface of the metal tubular body to form an inner tubular body, whilst the other of the two layers in ceramic matrix composite material coats the outer surface of the metal tubular body to form an outer tubular body, the metal tubular body therefore being sandwiched between the inner and outer tubular bodies, the metal tubular body having a mean thickness narrower than the mean thicknesses of the inner and outer tubular bodies.

The metal tubular body may be in metal or in a metal alloy.

It is specified that in the foregoing and in the remainder hereof that a ceramic matrix composite material is a material with fibre reinforcement.

The cross-section of the multilayer tubular part may be circular, oval, hexagonal, square . . . , circular cross-sections being preferred however.

It is specified that the inner and outer tubular bodies are not necessarily in one same <<material>>. In this respect, it is important to note that as the inner and outer tubular bodies are CMCs which are therefore <<structures>> (i.e. a combination of materials, of geometries and processes) rather more than <<materials>>, if it is said that the inner and outer tubular bodies are in one same <<material>> this means that they are obtained following the same process with the same type(s) of fibres (same chemical composition, same diameter) coated with the same interphase (same chemical composition, same thickness, same coating process), interlaced in similar manner to form the reinforcement (2D, 3D braiding, fibre winding . . . ) and with the same matrix (same chemical composition, same preparation method). Therefore, a contrario, two CMC materials formed of the same fibres and of the same matrix, but whose preform is produced differently (e.g. one by winding of the fibres and the other by 2D braiding of the fibres) will be considered to be two different materials.

Preferably, the metal tubular body has a mean thickness of between 5% and 20% of the mean thickness of the multilayer tubular part.

The hermetic sealing of a multilayer tubular part according to the invention may be subjected to stresses up to high temperatures; so that it is able to maintain its hermetic seal up to high temperatures the criteria for choice of the constituent material of the metal tubular body are:
compatibility with these high temperatures (melt margin, no allotropic transformation, maintained satisfactory mechanical properties); and
thermochemical compatibility with the constituent CMC material of the inner and outer tubular bodies.

Regarding the criteria for choice of the constituent material of the inner and outer tubular bodies, these are the same as those chosen for the metal tubular body, to which there is added the criterion of thermochemical compatibility with the media (fluid or solid) intended to come into contact with the inner and outer tubular bodies.

Therefore, preferably the metal tubular body is in a material chosen from among niobium and the alloys thereof, tantalum and the alloys thereof, tungsten and the alloys thereof, titanium and the alloys thereof. As examples of niobium alloys use can be made of Nb-1Zr or Nb-1Zr-0,1C; as tungsten alloy W-5Re can be used. In reality the choice of metal material is also determined by the need for the tubular part to withstand its conditions of preparation. As will be seen below, the manufacturing process proposed by the invention requires that the chosen metal material must be able to withstand the conditions for preparing the outer CMC (designed to be applied to the said metal layer), the manufacturing conditions of the outer CMC possibly reaching 1000° C. for example.

The inner and outer tubular bodies are preferably in $C_f/C$, $C_f/SiC$ or $SiC_f/SiC$ composite.

As previously explained, CMC materials only have a hermetic seal over a very small range which corresponds to the range of linear elasticity of the CMC material under consideration, since beyond this elasticity limit they undergo multi-cracking. The particular arrangement of the layers of the multilayer tubular part according to the invention allows the hermetic sealing of the part to be maintained up to the break point of the CMC materials rather than solely within their elastic range.

Therefore, if a SiC$_f$/SiC composite for example is used for the inner and outer tubular bodies, it is possible with reference to FIG. 1 to maintain hermetic sealing up until the ultimate elongation limit of the SiC$_f$/SiC composite which is of the order of 0.9% for an ultimate stress of the order of 300 MPa (the range of hermetic sealing which can be reached by the invention is hatched).

The multilayer tubular part of the invention is able to ensure the hermetic separation of two media (fluid or solid) (one lying outside the part and the other lying inside the part), even if there is a pressure difference between the inner surface and the outer surface of the part and the resulting mechanical load causes multiple cracking of one or of both inner and outer bodies. If the inner and outer tubular bodies are cracked they lose their hermetic seal but maintain their mechanical strength. They are therefore able to continue maintaining the mechanical integrity of the metal tubular body and hence to preserve the mechanical integrity of the multilayer tubular part in its entirety, the hermetic sealing of the part then rests on the metal tubular body.

It is specified that by the mechanical integrity of the CMC material is meant that there is no rupture of this material.

A further subject of the invention is a tubular structure having a closed cavity.

This structure first comprises a multilayer tubular part such as defined above, having one or two open ends, and secondly at least one cover for each open end, each cover being positioned at an open end so as fully to shut off the said open end, each cover comprising an inner layer in metal or metal alloy intended to be secured to the metal tubular body of the multilayer tubular part, and optionally an additional layer in ceramic matrix composite material intended to be secured to the outer tubular body of the multilayer tubular part, the closed cavity of the structure being delimited by an inner wall of the multilayer tubular part and by an inner wall of each cover.

Preferably, the multilayer tubular part, at each open end, comprises an annular region in which the metal tubular body is not covered by the outer tubular body and in which each cover is formed of a bottom part joined to a side edge, the said side edge being adapted to overlap the said annular region.

Advantageously, the structure is a nuclear fuel cladding capable of containing a nuclear fuel and the fission gases released by this fuel under radiation. In this case, the metal tubular body preferably has a mean thickness of between 50 and 200 micrometers.

For the cladding of a nuclear fuel element, the criteria for choice of constituent materials of the metal tubular body are:
  compatibility with radiation (small neutron capture cross-section and maintained satisfactory mechanical properties (i.e. guaranteeing no systematic failure with regard to reactor sizing) up to high radiation doses (higher than 50 dpa (displacements per atom) in thermal spectrum and 100 dpa in fast spectrum));
  compatibility with high temperatures (melt margin, no allotropic transformation, maintained satisfactory mechanical properties);
  thermochemical compatibility with the constituent CMC material of the inner and outer tubular bodies;
  weldability allowing hermetic sealing to be obtained via joining with a cover at the open ends.

The criteria for choice of the constituent material of the inner and outer tubular bodies are the same as for the metal tubular body in terms of compatibility with radiation and high temperatures, whilst the criterion of thermochemical compatibility is extended by requirements regarding reactions with the fuel and fission products for the inner tubular body, and with the coolant and its impurities for the outer tubular body.

Therefore the preferred materials cited above for the metal tubular body of the multilayer tubular part, namely niobium and the alloys thereof, tantalum and the alloys thereof, tungsten and the alloys thereof and titanium and the alloys thereof, and the preferred materials cited above for the inner and outer tubular bodies namely C/C, C/SiC or SiC/SiC composites, are fully suitable.

A further subject of the invention is a nuclear fuel element containing nuclear fuel housed in the closed cavity of the tubular structure such as defined above. The nuclear fuel may be in the form of nuclear fuel pellets (uranium and/or plutonium and/or thorium, in oxide, carbide, nitride form . . . ); the nuclear fuel element may therefore be a rod or pin.

The invention also concerns a process for manufacturing a multilayer tubular part such as defined above, which comprises the following successive steps:
  a) providing a tubular body in ceramic matrix composite material to form the inner tubular body;
  b) forming the metal tubular body on the inner tubular body;
  c) forming the outer tubular body on the metal tubular body, by implementing the following steps:
    preparing a fibrous pre-form of continuous fibres on the outer surface of the metal tubular body (e.g. by fibre braiding);
    applying a treatment to cause densification of the preform by forming a matrix in the said preform, the treatment being conducted at a temperature lower than the degradation temperature of the preform, lower than the degradation temperature of the metal tubular body and lower than the degradation temperature of the inner tubular body.

By <<degradation temperature>> is meant the temperature on and above which the material exhibits thermomechanical behaviour incompatible with the rules for use thereof in the intended application. In the extreme, it is the melt temperature, but the effective degradation temperature is likely to be lower: this depends on the thermochemical environmental conditions which are at the origin of reactions between materials. Therefore with respect to nuclear fuel cladding, consideration must be given to eutectic formations with the fuel and fission products, or to separating reactions possibly induced by the heat-exchange fluid, in particular under accidental conditions (in which the temperature increase (beyond 1000° C. for example) and the possible contribution by matter that is absent under normal conditions (air, water or nitrogen intake due to a break in the primary circuit of the reactor for example) are likely to activate potentially penalising thermochemical reactions (oxidation or hydriding at high temperature for example)).

To obtain the inner tubular body as indicated at step a), it is possible to use a commercially available prefabricated tubular body. It is also possible to choose to fabricate the same. In this case, step a) of the above process may comprise the following successive steps:
  preparing a continuous fibre fibrous preform on a cylindrical supporting element;
  applying treatment to cause consolidation of said preform by forming a matrix in the preform, the treatment being conducted at a temperature lower than the degradation temperature of the preform and lower than the degradation temperature of the supporting element;

removing the supporting element from the consolidated preform by chemical attack of the contact surface of the material of the supporting element with the consolidated preform;

densifying the consolidated preform at a temperature lower than the degradation temperature of the consolidated preform.

The consolidation, and also densification, may be obtained by CVI densification i.e. infiltration of a precursor gas of the ceramic matrix in the fibrous preform, carried out in a furnace at high temperature. Under the effect of the temperature and in contact with the fibrous preform, the precursor gas decomposes and produces carbon or ceramic compounds (silicon carbide or others) which fill in the porosity.

Densification and/or consolidation may also be obtained using a process of PIP type i.e. impregnating with a precursor polymer solution of the ceramic matrix of the inner tubular body to be formed, followed by pyrolysis of the precursor polymer at high temperature.

To form the metal tubular body on the inner tubular body there are two different manners to proceed.

According to a first variant, step b) comprises the vapour phase depositing of a layer in metal or metal alloy on the outer surface of the inner tubular body.

According to a second variant, step b) comprises the following successive steps:

inserting the inner tubular body in a metal or metal alloy tube;

plating this metal tube onto the outer surface of the inner tubular body;

optional annealing of the part thus formed.

The metal tubular body can be manufactured using techniques known to persons skilled in the art, for example a cold rolling technique (preferably HPTR rolling), hot rolling, drawing or extrusion. The cold rolling technique has the advantage of adapting to numerous metals and alloys.

Plating can be performed using techniques known to those skilled in the art, for example hot or cold drawing or magnetic pulsing.

This manufacturing process may also comprise, between steps a) and b), a surface treatment step of the surface of the inner tubular body to reduce the roughness thereof. This may entail diamond grinding of the outer surface of the composite tube using the <<centreless grinding>> technique.

It is also possible, between steps a) and b) and between steps b) and c), to conduct a deposit step to deposit a buffer layer in a material chosen to ensure thermomechanical compatibility with differences in expansion between the two adjacent bodies.

The invention also concerns a process for manufacturing a tubular structure such as defined above. This manufacturing process of a tubular structure comprises the manufacture of a multilayer tubular part following the manufacturing process of a multilayer tubular part described above, and shutting off the open end or ends of the said part by placing a cover on each of these open ends and securing the said cover onto the metal tubular body, each cover comprising an inner layer in metal or metal alloy and optionally an additional layer in ceramic matrix composite material.

The said process, for example, may comprise the forming of the multilayer tubular part so that at each of its open ends it comprises an annular region in which the metal tubular body is not covered by the outer tubular body, each annular region being fully covered by the inner metal layer of a cover when securing a cover onto the open end corresponding to the said annular region.

This annular region can be obtained by forming an outer tubular body of shorter length than the length of the metal tubular body at step c); it can also be obtained by removing a portion of the layer in ceramic matrix composite material forming the outer tubular body so as to have an annular portion leaving exposed the metal layer at the open end or ends of the metal tubular body. Once this annular region is obtained, it is then possible to secure the cover to the exposed part of the metal layer and, if the cover comprises an outer layer in CMC, to secure the CMC layer of the cover to the outer CMC layer of the part, using a method known to those skilled in the art such as brazing for example.

The arrangement and particular characteristics of the layers of the tubular part according to the invention impart numerous advantages thereto.

First, by arranging the metal layer (which acts as hermetic sealing layer) between two CMC layers, this amounts to preserving the hermetic sealing layer between two mechanical reinforcements which, on account of their rigidity, protect the layer against thermomechanical stresses applied firstly by the product contained in the tubular part (the nuclear fuel and fission gases released by it under radiation in the reactor for example) and secondly by the product lying outside the tubular part (e.g. the coolant, optionally pressurized), thereby providing against any risk of excessive deformation likely to lead to deterioration of the hermetic sealing layer.

On account of the particular manufacturing process, the metal layer is geometrically stressed by the composite layers and, since it is of narrow thickness compared with the composite layers, it only takes a very limited part in the mechanical strength of the final part. Under conditions of use, the load is mostly borne by the composite layers of greater thickness. As illustrated in FIG. 1, this manufacturing process allows the part to be subjected to stresses beyond the elastic limit of the composite material used alone: the composite layers may therefore crack without the multilayer tubular part losing its hermetic sealing properties.

In addition, the optional but preferable choice of identical materials for the two CMC layers means that it can be guaranteed that they do not cause major deformation differences on the two sides of the metal layer which they surround. It must not be forgotten that the metal layer is thin compared with the two CMC layers and that is therefore scarcely resistant.

Also, since the metal layer is thin compared with its surrounding CMC layers, and on account of its very good heat conductivity, the temperature difference between its sides is small.

In the particular case in which the tubular part is used as nuclear fuel cladding, since the hermetic sealing layer (metal layer) is arranged between two CMC layers, the hermetic sealing layer is protected against thermochemical attack by the fuel and fission products against which it is <<insulated>>. There is effectively no direct contact, with the exception of possible migrations of fission products through the inner CMC layer which are naturally limited by the thickness of the inner CMC layer and by controlled cracking thereof. It is possible to further protect the hermetic sealing layer by arranging a protective layer on the inner CMC layer (inner tubular body); the CMC layer is then not in direct contact with the fuel. This protective layer is a layer of <<solid porous joint>> type, known to those skilled in the art. This layer of <<solid porous joint>> type may for example have a fibrous or honeycomb structure in C and/or SiC, and with high porosity allowing the accommodating via its collapse of volume expansion of the fuel without any mechanical load being applied to the cladding, the promoting of heat transfer from the fuel towards the cladding and carrying of the released fission gases towards the gaseous plenum located at the axial end of the fuel element. By means of this particular arrangement the hermetic sealing layer is protected against physical attack caused by the fission products generated on the periphery of the fuel, whose recoil energy creates damage which is absorbed by the inner CMC layer, even by the optional protective layer. Therefore the metal layer meets its hermetic sealing function which is particularly required to contain the radioactive products created by irradiation of the nuclear fuel (uranium and/or plutonium and/or thorium, in oxide, carbide, nitride form . . . , possibly containing minor actinides such as americium, neptunium, curium . . . ).

Since it is arranged between two CMC layers, the hermetic sealing layer is also protected against thermochemical attack by the coolant and its impurities from which it is <<insulated>>. There is no direct contact, apart from possible migrations of impurities through the outer CMC layer which are naturally limited by the thickness of the outer CMC layer and by controlled cracking.

Finally, the closing of the cladding at its ends, proposed as an example, is facilitated compared with a cladding provided with an inner metal layer since it is possible to perform conventional welding operations between this metal layer and conventional closing means (closing covers and lids).

To summarize, the original design of the multilayer part proposed by the invention allows ensuring of the hermetic sealing function up until dismantling:
  by ensuring the mechanical integrity of the thin metal layer via the reinforcement afforded on its two sides by the CMC layers sized to guarantee the mechanical strength of the part (cladding) against usual operating stresses;
  by ensuring the physicochemical integrity of the thin metal layer against thermochemical attack (by the fuel and its fission products and also by the coolant and its impurities), and against physical attack (damage by the recoil energy of fission fragments created on the periphery of the fuel) via the protection afforded by the CMC layers arranged on its two sides;
  by facilitating the hermetic sealing of the part at its open ends.

Figure 2:
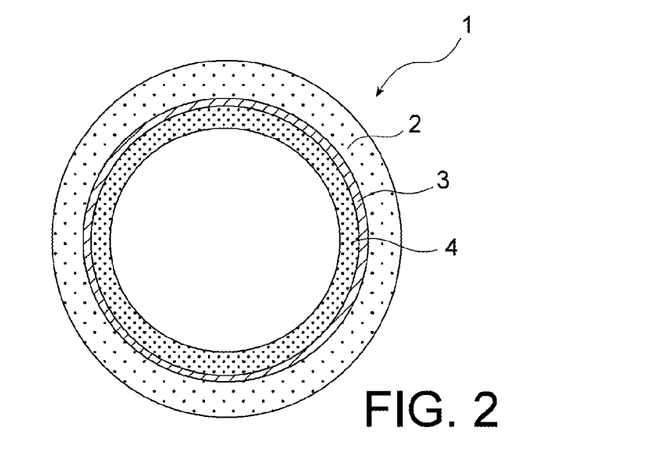
FIG. 2 schematically illustrates an axial section view of the multilayer tubular part according to the invention.
Figure 3A:
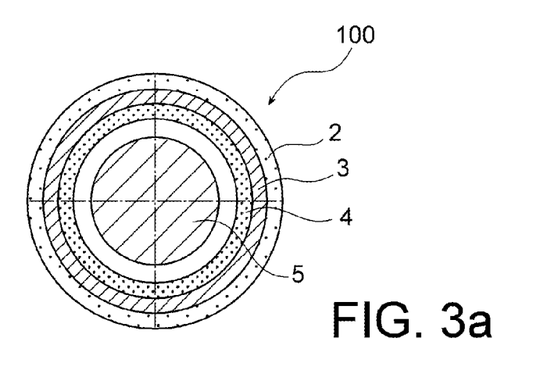
FIGS. 3a and 3b give an axial section and longitudinal section view respectively of a nuclear fuel cladding according to the invention, obtained by placing a nuclear fuel inside a multilayer tubular structure according to the invention.
Figure 3B:
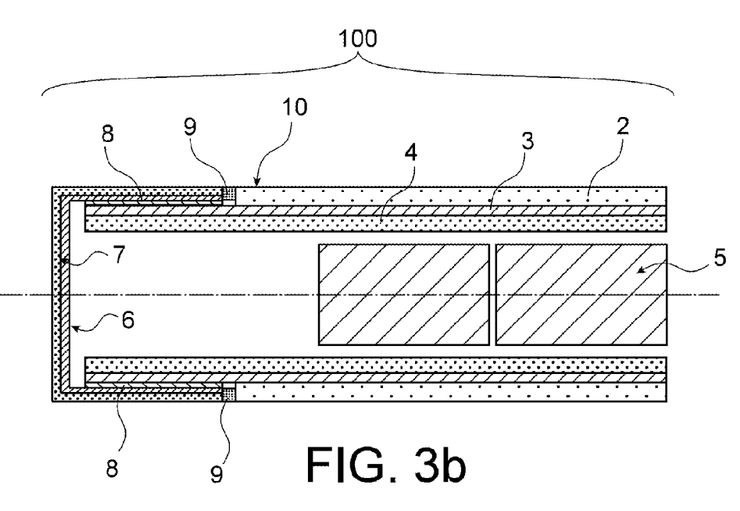

The invention will be better understood and other advantages and aspects will become apparent on reading the following description given as a non-limiting example accompanied by the appended FIGS. 2, 3a and 3b.

BRIEF DESCRIPTION OF THE DRAWINGS

FIG. 1 illustrates a usual range of mechanical use of the composites as nuclear fuel cladding, with stresses possibly reaching the order of 200 MPa and strain of the order of 0.5%. Since a cladding of a nuclear fuel element must maintain its hermetic seal and mechanical integrity in any sizing situation, the material whose behaviour is illustrated in FIG. 1 meets the requirement of mechanical integrity (in that there is no rupture or excessive deformation of the cladding) but only meets the requirement of hermetic sealing over its elastic range which is more restricted than the range of use. The object of the patent is to extend the range of hermetic sealing of the nuclear fuel cladding in ceramic matrix composite ($SiC_f$/SiC, in particular), beyond the range of mechanical use of this type of object: the three regions (accessible/use/targeted) are illustrated in the Figure using a hatched system.

It is to be noted that the thicknesses of the different tubular bodies are not drawn to scale in FIGS. 2, 3a and 3b. For better visualizing of the metal tubular body its thickness is shown to be comparable to that of the inner and outer tubular bodies which in reality are much thicker.

DETAILED DESCRIPTION OF PARTICULAR EMBODIMENTS

With reference to FIG. 2, the tubular part 1 of the invention has an outer layer in CMC material forming an outer tubular body 2, overlying a metal tubular body 3, which itself overlies an inner layer in CMC material forming an inner tubular body 4.

Preferably this tubular part may be used to form a nuclear fuel cladding 10 intended to contain nuclear fuel to form a fuel element 100.

In this case, the nuclear fuel is placed in the tubular part 1, as illustrated in FIG. 3a. The space shown between the inner tubular body 4 and the nuclear fuel 5 may correspond to a gaseous medium or to a porous solid interface joint whose function in particular is:
  to accommodate, by collapsing, the volume expansion of the fuel without any mechanical load being applied to the cladding;
  to promote heat transfer from the fuel towards the cladding;
  to carry released fission gases towards the gas plenum located at the axial end of the fuel element.

The multilayer tubular part of the invention is formed of tubular bodies or tubes which may therefore have two open ends or one open end (the other end being a blind end).

To obtain a nuclear fuel cladding 10, the nuclear fuel 5 must be contained within a sealed enclosure and therefore the open ends of the tubular part 1 must be sealed.

As illustrated in FIG. 3b, one manner proposed by the invention to close the open ends of the tubular part 1 is to provide an annular region in the vicinity of the open ends in which the metal tubular body is not covered by the outer tubular body: the metal layer is therefore accessible on the surround of the open ends of the tubular part. This region can be obtained by removing a portion of the outer layer forming the outer tubular body 2. All that is then required is to position a first metal cover 6 on the two open ends of the tubular part 1, so as to cover the metal layer of the metal tubular body in the annular region and to close the metal tubular body. This closing can be obtained by securing this first cover 6 onto the annular region by forming a weld 8 between the metal walls of the first cover 6 and the annular region. A second cover 7 in CMC material can then be positioned on the first cover to close the outer tubular body 2 in CMC material. It is also possible to use a single cover composed both of an inner metal layer on which a layer in CMC material is deposited.

The second cover is optional if the first cover (metal cover) meets all the constraints for sealing the tubular part, in particular the withstand of the bottom effect well known to those skilled in the art.

Preferably, the cover or covers are mounted and secured to the tubular part so that there is a continuous joining first between the metal layer of the metal tubular body 3 and the first cover 6 (or with the inner metal part of the cover if there is only one cover) and secondly between the outer tubular body 2 and the second cover 7 (or with the outer part in CMC material of the cover if there is only one cover). The said continuous joining can be obtained for example via welding if joining is between two metals or via brazing if joining is between CMC materials.

It is to be noted that the nuclear fuel cladding 10 schematized in FIGS. 2a and 2b is illustrated in the cold state and at the start of irradiation within the reactor, hence the presence of the space between the inner body 4 and the nuclear fuel 5.

The nuclear fuel 5 is in the form of fuel pellets which are stacked inside the fuel cladding 10 the whole forming a fuel element 100.

It is to be noted that the axial space between the nuclear fuel 5 and the first cover 6 is intended to be occupied by an axial positioning device (not illustrated) for the column of fuel pellets (device typically comprising a spring, a spacer and/or wedges).

The CMC materials of the outer and inner tubular bodies of the tubular part may be ceramic matrix composites, for example of $SiC_f/SiC$, $SiC_f/TiC$, $SiC_f/ZrC$ or $SiC_f/Ti\ SiC_2$ type such as mentioned in document [6].

The hermetic sealing layer is a metal or metal alloy: niobium and its alloys, tantalum and its alloys, tungsten and its alloys, titanium and its alloys; e.g. Nb-1Zr, Nb-1Zr-0,1C, Ta, W-5Re. It is important to note that to guarantee the integrity and properties of the item, the chemical compatibility of the metal or alloy with the CMC material used must be verified over the entire range of temperature of use of the future tubular part, and over the entire temperature range for manufacture of the CMC layers.

The thickness values of the different layers of the multilayer tubular part are preferably within the following ranges:
  inner CMC layer (inner tubular body): 0.2 to 0.5
  metal hermetic sealing layer (metal tubular layer): 50 to 200 μm;
  outer CMC layer (outer tubular body): 0.3 to 1 the thicknesses of the inner and outer CMC layers being chosen however so that they are greater than the thickness of the hermetic sealing layer, preferably 3 times greater or more than the hermetic sealing layer. It is sought to minimize the thickness of the hermetic sealing layer and the overall thickness of the multilayer tubular part, to optimize the neutron.

The multilayer tubular part of the invention is advantageous in that it uses a large majority of ceramic matrix composite phases in lieu and stead of a fully metal part. The purpose of the metal layer here is solely to guarantee the hermetic sealing of the overall part. For many envisaged applications (pressure chamber operating at high temperature for example), the use of metal is not recommended on account of its density and/or weak mechanical strength at high temperature and/or on account of its neutron capture cross-section for nuclear applications. It is therefore necessary to limit the thickness of the metal layer to a strict minimum.

The manufacturing of a multilayer part according to the invention can be broken down into several steps, namely:
 1) the manufacture of the inner tubular body in CMC material;
 2) the preparation of the outer surface of this inner tubular body (this step being optional but preferable);
 3) the manufacture of the metal tubular body (hermetic sealing tube of narrow thickness;
 4) plating, or using any other deposit technique known to those skilled in the art, the metal tubular body onto the inner tubular body ;
 5) preparing the outer surface of the metal tubular body thus obtained (this step being optional but preferable);
 6) producing the fibrous preform of the outer tubular body directly on the metal tubular body obtained at step 5, followed by densification thereof, and finally optional final coating thereof (this coating being optional but preferable) leading to obtaining of the multilayer part.

It is to be noted that it is also possible, instead of manufacturing the inner tubular body and the metal tubular body, to use ready-made tubes.

The first step to manufacture the part is to prepare a tube intended to form the inner tubular body in CMC material. To do so, a fibrous reinforcement is formed around a cylindrical mandrel chosen to suit the type of composite to be prepared.

For composites with reinforcement and matrix of carbon or silicon carbide type, it is preferable to use a mandrel in silica glass so that the mandrel is able to be easily removed at the end of the process by mere chemical dissolution. A good inner surface of the inner tube and heed of dimensions and tolerances (which are most important requirements for the cladding of a nuclear fuel element in particular) are more accessible with this type of mandrel than with a mandrel in graphite that is conventionally used.

For the manufacturing of ceramic matrix composites using oxide phases, the type of mandrel must be adapted to the subsequent densification process.

The shaping of the fibrous architecture of the reinforcement can be achieved using one of the techniques derived from the textile industry suitable for geometric parts having an axis of revolution, such as fibre winding, 2D braiding or 3D interlock.

The thickness of the reinforcement (number of braiding or wind layers) is chosen in accordance with the thickness chosen for this inner tube.

Once the forming of the reinforcement on the mandrel is completed, the reinforcement is densified. For this purpose, a chemical vapour infiltration process or CVI, well known to persons skilled in the art, can be used although other processes such as sintering, Polymer Infiltration Process or PIP, liquid- or mixed-route processes can also be used.

When the densifying of the reinforcement is completed, the mandrel used as support for the reinforcement is removed.

The second step, which is optional but preferable, is to prepare the outer surface of the inner composite tube thus obtained, that is rough and abrasive by nature, so as to obtain a surface having a maximum RMS roughness of 1 to 2 μm to allow optimal plating of the future metal tube acting as hermetic sealing layer onto the inner composite tube.

The outer surface of the composite tube can be machined. Experience has shown that diamond grinding of the outer surface of the composite tube using the <<centreless grinding>> technique gives good results: mean surface roughness values of about 1 µm can be obtained for a surface subjected to such grinding as compared with 50 to 100 µm without any preparation.

It is also possible to have recourse to the chemical or physical vapour depositing (CVD or PVD) of a layer having a thickness of a few hundred nanometers on the outer surface of the said inner composite tube, or to deposit a ceramic coating obtained by liquid route.

Depending on the material chosen for the said layer, this layer may also have the purpose of accommodating differences in deformation between the CMC composite tube and the metal layer applied to the outer surface at the following step of the process. For example, for a composite tube in $SiC_f/SiC$ it is possible to use a material of pyrocarbon type to form this layer.

At the third step a metal tube is prepared which will be used as hermetic sealing layer to form the metal tubular body of the multilayer part. The choice of type of metal is highly important for the intended application and will depend on the type of composite used for the inner and outer tubes and conditions of use. In particular, a metal phase must be chosen that is compatible with the ceramic phases of the composite, whether over the range of operating temperatures of the final part or over the range of manufacturing temperatures of the composite as per the chosen densification process.

If the composites are $C_f/C$, $C_f/SiC$ or $SiC_f/SiC$ for example, the possible densification processes require implementation temperatures close to 1000° C. In this case, it is therefore necessary to choose only those metals which have good chemical compatibility with the carbon and silicon carbide phases at 1000° C. The proposed metals are niobium and its alloys (Nb-1Zr, Nb-1Zr-0,1C), but also tantalum and its alloys, tungsten or titanium to a lesser extent.

Evidently, if different ceramic phases are concerned, other alloys may be more suitable.

To limit the thickness of the metal tube to the strict minimum, it is chosen to use a technique for forming the metal tube to the desired dimensions which allows a minimum thickness of up to 0.1 mm to be obtained, even lower. It is possible for example to use a cold rolling technique, this technique having the advantage of adapting to numerous metals and alloys. Here the inventors used an HPTR rolling bench but other cold or hot rolling benches can be used. It is also possible to use drawing or extrusion technique.

For the dimensions of the metal tube, an inner diameter is targeted that is equal to the outer diameter of the composite inner tube after grinding, to which clearance is added so that inner composite tube is able to be inserted into the metal tube, this clearance however being as narrow as possible to facilitate the plating step described below. For the conducted tests a diametric clearance of the order of 0.1 mm was used. It is to be recalled here that rolling has the effect of hard working the metal or alloy used. The main consequence of this working is to increase the hardness of the material and to limit its ultimate deformation. To restore the properties of the metal or alloy close to the initial values, it is preferable to perform annealing after rolling, particular to each material.

The following step entails plating the metal tube onto the inner composite tube. The purpose of this operation is to guarantee close contact between these two elements. This plating can be obtained using several techniques. It is possible for example to have recourse to controlled drawing of the metal tube onto the inner composite tube. For this purpose, the inner composite tube is inserted in the metal tube made possible by the clearance provided; the metal tube is then mechanically subjected to tensile stress so that it retracts onto the wall of the inner composite tube (Poisson effect).

Other plating techniques can be envisaged such as hot drawing or magnetic pulsing which uses a magnetic field of strong intensity to plate the metal tube onto the non-magnetic inner composite tube.

It is also possible to replace the manufacturing step of the metal tube and plating step by using a chemical vapour or physical vapour depositing technique, (CVD or PVD), to deposit a metal layer directly on the inner composite tube.

At a fifth step that is optional but preferable, the bilayer tube once formed can optionally undergo grinding to reduce roughness on its outer metal surface, or vapour phase depositing of an additional layer as described previously for the inner composite tube.

The last step consists of manufacturing the outer composite tube. The procedure is similar to that used to manufacture the inner composite layer. The fibrous reinforcement is first shaped using the same techniques as those previously mentioned (fibre winding, 2D braiding or 3D interlock) followed by densification. For this manufacture, and contrary to the first step which required the use of a temporary supporting mandrel, the outer composite tube here is directly shaped on the prepared composite/metal bilayer tube.

This then gives a multilayer ceramic matrix composite part that is hermetically sealed up to yield point such as illustrated in FIG. 2.

Optionally, if it is desired that the final part should have minimum roughness on its outer surface, this outer surface (i.e. the outer composite tube) can be ground using centreless grinding or an additional layer can be applied thereto.

The multilayer tubular part thus prepared can be used to produce a pressurised fluid duct or a pressure chamber, such as cladding for a nuclear fuel element. A description is given below of the manufacture of cladding for nuclear fuel element, this being the priority targeted application of the invention.

As described above, first an inner CMC tube is prepared, here a tube in $SiC_f/SiC$ of inner diameter 7 mm and thickness of 300 µm, optionally completed by the coating of the outer surface of the composite tube with a layer of material of pyrocarbon type.

A metal tube in tantalum is then prepared of inner diameter 7.7 mm and thickness of 100 µm, either by rolling followed by plating (using a magnetic forming or drawing technique) over the inner CMC tube or by vapour phase depositing a layer directly onto the inner CMC tube.

The tantalum layer is optionally coated with a layer of material of pyrocarbon type having a thickness of a few hundred nanometres.

Finally an outer composite tube in $SiC_f/SiC$ is produced of thickness 600 µm directly on the part obtained at the preceding step, by forming the reinforcement in SiC/SiC and impregnating this reinforcement following usual procedure, optionally completed by coating or grinding the outer surface of this outer composite tube. This latter coating, performed by vapour phase (PVD or CVD)depositing of a material of SiC type to a thickness of a few hundred nanometers, is intended to produce a smooth surface finish if this meets a requirement (this may be necessary to limit pressure drops associated with friction of the coolant along the cladding for example).

To obtain a multilayer structure (multilayer part whose open ends are sealed off), the ends of the multilayer tubular part are cleared by machining the outer CMC layer, for example over a length of 5 mm, without damaging the underlying metal layer.

One of the two ends of the tubular part is then closed by welding a cover or metal lid 6 onto the part of the metal tube previously cleared (cover having a thickness of 100 µm for example obtained by stamping) then brazing a cover in CMC material (e.g. SiC$_f$/SiC) onto the outer CMC tube. In FIG. 3b, the weld bead is identified by reference 8 whilst the braze bead is identified by reference 9.

It is optionally possible to combine the metal cover and CMC cover in a single lid.

The CMC cover may be optional, provided a metal is chosen for the cover having adequate thermomechanical properties in terms of refractoriness and resistance to inner pressure under normal and accidental operation. It is possible for example to use a metal cover of thickness 700 µm, obtained by stamping or machining, welded to the metal tube and brazed to the outer CMC tube of the multilayer tubular part.

It will be noted that this sealing step of an end of the multilayer tubular structure can become optional if the preceding steps are carried out so as to manufacture a blind tube (closed at one of its ends).

The pellets of nuclear fuel 5 can then be inserted (which here have a diameter of 6.71 mm) inside the tubular structure together with the inner fittings (spring, spacer, wedges) which are arranged between the column of pellets and the cover (not illustrated in FIG. 3b).

Finally the closing of the other open end of the tubular part can be carried out following the procedure described above.

The innovation of the proposed solution lies in the multilayer nature of the cladding concept, with the positioning of the metal layer acting as hermetic sealing layer between two CMC layers meeting requirements of refractoriness and mechanical strength to obtain an advanced fuel element.

With this particular positioning it is possible to obtain a hermetic sealing layer of narrow thickness (50 to 200 µm) without any risk of weakening through excessive deformation up to high temperatures and neutron flows, and without any risk of damage by the nuclear fuel and its fission products up to high combustion levels.

This narrow thickness of the metal layer and the lack of any strong interaction with the fuel and its fission products allow recourse to a wide range of hermetic sealing materials.

This solution proposes a durable containment mode of fission products for a fuel element having a cladding in CMC material. In this respect, it opens up prospects of use for this type of cladding whose refractoriness (accompanied by good neutron properties) should allow increased safety of the fuel element whilst guaranteeing its geometric integrity (guaranteed control over reactivity and coolability of the reactor core) up to the very high temperatures of accidental transients which are to be taken into account in the sizing thereof.

The outer and inner tubes in CMC material not only act as mechanical reinforcement but also as refractory reinforcement intended to consolidate the resistance of a conventional metal cladding to accidental transients (thermal stability and creep resistance), which allows the safety objectives to be reached that are typically targeted for GFRs or for a major improvement in the resistance of cladding to the high temperature conditions of some accidental transients in PWRs, BWRs and SFRs.

BIBLIOGRAPHY

[1] U.S. Pat. No. 5,182,077
Feinroth et al., "Water cooled nuclear reactor and fuel elements therefor"
[2] US 2006/0039524 A1
Feinroth et al., "Multi-layered ceramic tube for fuel containment barrier and other applications in nuclear and fossil power plants"
[3] U.S. Pat. No. 5,681,511
Streckert et al., "Hermetic ceramic composite structures"
[4] Spatz et al.
"Design of hybrid ceramic-metal tubes", Proceedings for HTCMC-7, pp. 572-578
[5] US 2009/0101658 A1
Maile et al., "Pressure-resistant body that is supplied with fluid"
[6] WO 2010/031925 A2
Cabrero et al., "Gaine de combustible nucleaire a haute conductivite thermique et son procédé de fabrication" ("Nuclear fuel sheath with high heat conductivity and its method of fabrication")

What is claimed is:

1. A nuclear fuel cladding for a nuclear reactor, wherein the nuclear fuel cladding is a multilayer tubular part which has two ends, at least of said ends being open, the nuclear fuel cladding comprising: a full metal layer forming a metal tubular body; a first layer of ceramic matrix composite material which covers an inner surface of the metal tubular body, thereby forming an inner tubular body, a second layer of ceramic matrix composite material which covers an outer surface of the metal tubular body, thereby forming an outer tubular body; the metal tubular body therefore being sandwiched between the inner and outer tubular bodies and improving hermeticity of the nuclear fuel cladding, and the metal tubular body having a smaller mean thickness than the mean thicknesses of the inner and outer tubular bodies, wherein The inner tubular body is made of a ceramic matrix composite chosen among a C$_f$/C composite, a C$_f$/SiC composite or a SiC$_f$/SiC composite and the outer tubular body is made of a ceramic matrix composite chosen among a C$_f$/C composite, a C$_f$/SiC composite or a SiC$_f$/SiC composite.

2. The nuclear fuel cladding of claim 1, wherein the metal tubular body has a mean thickness of between 5% and 20% of a mean thickness of the multilayer tubular part.

3. The nuclear fuel cladding of claim 1, wherein the metal tubular body is in a material chosen from among niobium and its alloys, tantalum and its alloys, tungsten and its alloys, and titanium and its alloys.

4. A tubular structure having a closed cavity and comprising a nuclear fuel cladding as defined in claim 1 and a cover for each open end of the nuclear fuel cladding, the cover being positioned at an open end thereby sealing fully the open end, the cover comprising an inner layer in metal or metal alloy to be secured to the metal tubular body of the nuclear fuel cladding, the closed cavity of the tubular structure being delimited by an inner wall of the nuclear fuel cladding and by an inner wall of the cover.

5. The tubular structure of claim 4, wherein the nuclear fuel cladding, at the at least one open end, comprises an annular region in which the metal tubular body is not covered by the outer tubular body and wherein the cover is formed of a bottom connected to a side edge, the side edge being adapted to cover the annular region.

6. The tubular structure of claim 4, wherein the closed cavity is configured to contain a nuclear fuel and the fission gases released by the nuclear fuel when irradiated.

7. The tubular structure of claim 6, which has a mean thickness of between 50 and 200 micrometers.

8. A nuclear fuel element comprising nuclear fuel housed the a closed cavity of the tubular structure of claim 4.

9. A process for manufacturing the nuclear fuel cladding of claim 1, comprising:
   a) providing a tubular body in ceramic matrix composite material to form the inner tubular body, the inner tubular body being made of a ceramic matrix composite chosen among a $C_f/C$ composite, a $C_f/SiC$ composite or a $SiC_f/SiC$ composite, by:
   preparing a first fibrous preform of continuous fibres on a cylindrical supporting element;
   applying treatment to cause consolidation of the first fibrous preform by forming a matrix in the first fibrous preform, the treatment being conducted at a temperature lower than the degradation temperature of the first fibrous preform and lower than a degradation temperature of the supporting element, thereby obtaining a first consolidated preform;
   removing the supporting element from the first consolidated preform by chemical attack of a contact surface of a material of the supporting element with the first consolidated preform;
   densifying the first consolidated preform at a temperature lower than a degradation temperature of the first consolidated preform;
   b) forming the metal tubular body on the inner tubular body;
   c) forming the outer tubular body on the metal tubular body, the outer tubular body being made of a ceramic matrix composite chosen among a $C_f/C$ composite, a $C_f/SiC$ composite or a $SiC_f/SiC$ composite, by:
   preparing a second fibrous preform of continuous fibres on the outer surface of the metal tubular body;
   applying treatment to cause densification of the second fibrous preform by forming a matrix in the second fibrous preform, the treatment being conducted at a temperature which is lower than a degradation temperature of the second fibrous preform, lower than a degradation temperature of the metal tubular body and lower than a degradation temperature of the inner tubular body.

10. The process of claim 9, wherein step b) comprises the vapour phase depositing of a metal or metal alloy layer on the outer surface of the inner tubular body.

11. The process of claim 9, wherein step b) comprises:
   inserting the inner tubular body in a metal tube made of metal or metal alloy;
   plating this metal tube onto an outer surface of the inner tubular body, thereby forming a part;
   optional annealing of the part thus formed.

12. The process of claim 9, further comprising, between steps a) and b), a surface treatment of a surface of the inner tubular body to reduce a roughness thereof.

13. A process for manufacturing a tubular structure for a nuclear reactor, the tubular structure having a closed cavity and comprising a nuclear fuel cladding,
   wherein the nuclear fuel cladding comprises:
   a full metal layer which forms a metal tubular body;
   a first layer of ceramic matrix composite material, which covers an inner surface of the metal tubular body, thereby forming an inner tubular body; a second layer of ceramic matrix composite material which covers an outer surface of the metal tubular body, thereby forming an outer tubular body; the metal tubular body therefore being sandwiched between the inner and outer tubular bodies and improving hermeticity of the nuclear fuel cladding, and the metal tubular body having a smaller mean thickness than the mean thicknesses of the inner and outer tubular bodies; and
   the inner tubular body being made of a ceramic matrix composite chosen among a $C_f/C$ composite, a $C_f/SiC$ composite or a $SiC_f/SiC$ composite and the outer tubular body being made of a ceramic matrix composite chosen among a $C_f/C$ composite, a $C_f/SiC$ composite or a SiCf/SiC composite;
   wherein the nuclear fuel cladding has two open ends, at least one of the open ends being open, and a cover for each open end, the cover being positioned at an open end, thereby fully sealing the open end, and the cover comprising an inner layer made of metal or metal alloy to be secured to the metal tubular body of the nuclear fuel cladding, the closed cavity of the tubular structure being delimited by an inner wall of the nuclear fuel cladding and by an inner wall of the cover;
   wherein the process comprises manufacture of a nuclear fuel cladding according to the process of claim 9 and sealing of each open end of the nuclear fuel cladding by placing a cover on each open end and securing the cover onto the metal tubular body, the cover comprising an inner layer made of metal or metal alloy.

14. The tubular structure of claim 4, wherein the cover further comprises an additional layer in ceramic matrix composite material to be secured to the outer tubular body of the nuclear fuel cladding.

* * * * *

UNITED STATES PATENT AND TRADEMARK OFFICE
CERTIFICATE OF CORRECTION

PATENT NO. : 9,548,139 B2  
APPLICATION NO. : 14/236189  
DATED : January 17, 2017  
INVENTOR(S) : Maxime Zabiego et al.

Page 1 of 1

It is certified that error appears in the above-identified patent and that said Letters Patent is hereby corrected as shown below:

In the Specification

Column 11, Line 39: replace "Ti SiC$_2$" with -- Ti$_3$SiC$_2$ --.

Signed and Sealed this  
Sixth Day of June, 2017

Michelle K. Lee  
*Director of the United States Patent and Trademark Office*